(12) United States Patent
Regan et al.

(10) Patent No.: US 8,699,327 B2
(45) Date of Patent: Apr. 15, 2014

(54) MULTIPATH VIRTUAL ROUTER REDUNDANCY

(75) Inventors: Joseph M. Regan, Pleasanton, CA (US); Ron E. Haberman, San Jose, CA (US); Wenao Hu, San Jose, CA (US); Paul Kwok, Sunnyvale, CA (US)

(73) Assignee: Alcatel Lucent, Paris (FR)

( * ) Notice: Subject to any disclaimer, the term of this patent is extended or adjusted under 35 U.S.C. 154(b) by 1419 days.

(21) Appl. No.: 11/712,596

(22) Filed: Feb. 27, 2007

(65) Prior Publication Data

US 2008/0181241 A1 Jul. 31, 2008

Related U.S. Application Data

(60) Provisional application No. 60/898,771, filed on Jan. 31, 2007.

(51) Int. Cl.
| | | |
|---|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/56 | (2006.01) |

(52) U.S. Cl.
CPC ............ *H04L 45/586* (2013.01); *H04L 45/02* (2013.01); *H04L 45/021* (2013.01); *H04L 45/28* (2013.01)
USPC ............ 370/219; 370/216; 370/217; 370/220

(58) Field of Classification Search
CPC ..... H04L 45/02; H04L 45/021; H04L 45/028; H04L 45/586
USPC .......................... 370/217, 397, 216, 219, 220
See application file for complete search history.

(56) References Cited

U.S. PATENT DOCUMENTS

| | | | | |
|---|---|---|---|---|
| 7,581,024 B1 * | 8/2009 | Yip et al. | ...................... | 709/244 |
| 7,835,270 B2 * | 11/2010 | Lei et al. | ...................... | 370/220 |
| 2003/0112808 A1 * | 6/2003 | Solomon | ...................... | 370/400 |
| 2004/0218615 A1 * | 11/2004 | Griffin et al. | ................ | 370/401 |
| 2005/0201372 A1 * | 9/2005 | Hares | ............................ | 370/389 |

(Continued)

FOREIGN PATENT DOCUMENTS

| | | |
|---|---|---|
| EP | 1 633 089 A | 3/2006 |
| EP | 1633089 | 8/2006 |
| WO | WO 2004/021652 A | 3/2004 |

OTHER PUBLICATIONS

Hinden R et al: "Virtual Router Redundancy Protocol (VRRP); rfc3768.txt" IETF Standard, Internet Engineering Task Force, IETF, CH, Apr. 1, 2004, XP015009548 ISSN: 000-0003 Chapters 1-8.

(Continued)

*Primary Examiner* — Ayaz Sheikh
*Assistant Examiner* — Tarell Hampton
(74) *Attorney, Agent, or Firm* — Van Pelt, Yi & James, LLP (57) ABSTRACT

Providing gateway redundancy is disclosed. On each of a master and a standby gateway a single IP routing redundancy protocol instance is associated with a plurality of subscriber subnets. On each gateway, the respective single IP routing redundancy protocol instance is used to provide gateway redundancy for the plurality of subscriber subnets.

20 Claims, 6 Drawing Sheets

(56) References Cited

U.S. PATENT DOCUMENTS

| | | |
|---|---|---|
| 2005/0281191 A1* | 12/2005 | McGee et al. ............... 370/216 |
| 2006/0120374 A1* | 6/2006 | Yoshimoto et al. .......... 370/392 |
| 2006/0133329 A1* | 6/2006 | Lewis et al. ................. 370/338 |
| 2006/0155828 A1* | 7/2006 | Ikeda et al. .................. 709/220 |
| 2006/0291378 A1* | 12/2006 | Brotherston et al. ........ 370/221 |
| 2007/0008880 A1* | 1/2007 | Buchko et al. ............... 370/218 |
| 2007/0081535 A1* | 4/2007 | Li ................................ 370/392 |
| 2007/0230472 A1* | 10/2007 | Jesuraj ......................... 370/392 |

OTHER PUBLICATIONS

Li Juniper Networks B Cole Juniper Networks P Morton Cisco Systems D Li Cisco Systems T: "Cisco Hot Standby Router Protocol (HSRP); rfc2281.txt" IETF Standard, Internet Engineering Task Force, IETF, CH, Mar. 1, 1998, XP015008065 ISSN: 0000-0003 Chapters 4 to 6.

* cited by examiner

MULTIPATH VIRTUAL ROUTER REDUNDANCY

CROSS REFERENCE TO OTHER APPLICATIONS

This application claims priority to U.S. Provisional Patent Application No. 60/898,771 entitled MULTIPATH VIRTUAL ROUTER REDUNDANCY, filed Jan. 31, 2007 which is incorporated herein by reference for all purposes.

BACKGROUND OF THE INVENTION

The virtual routing redundancy protocol (VRRP) enables multiple Internet protocol (IP) routers to be presented as a single virtual router. A virtual router provided using VRRP can be used, for example, to provide a redundant gateway. At any one time, one router in a VRRP group serves as "master" and the others in "standby" with respect to an IP address associated with the group. If the router serving as master fails, VRRP provides a mechanism (based on VRRP priority) to determine which standby router will assume the role of master. Typically, the master sends regularly to a multicast IP address associated with the VRRP group VRRP advertisements that tell the standby routers that the master is still active, adjust VRRP priorities among the standby routers, etc. Such advertisements consume network bandwidth and overhead at the master and standby routers. Therefore, there is a need for a way to minimize VRRP-associated resource consumption, particularly in contexts in which redundancy is provided with respect to multiple subscriber host and/or service contexts.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing routing redundancy for multiple paths (e.g., multiple subscriber and/or service contexts, such as multiple service access points) using a single VRRP instance is disclosed. Instead of each path (connection) sending its own VRRP messaging, a single service or other context sends VRRP messages on behalf of itself and other service (or other contexts) with which it has been grouped. If the master router fails and/or a controlled switchover to a standby router is required, a single VRRP instance at the current master and/or the standby that is to take over (e.g., per normal VRRP succession) manage(s) the failover/switchover for all service (or other) contexts in the group.

In some embodiments, on each of a master and a standby gateway a respective single IP routing redundancy protocol (e.g., VRRP) instance is associated with a group IP interface that has associated with it a plurality of subscriber subnets. The single IP routing redundancy protocol instance is used to provide gateway redundancy for the subscriber subnets comprising the group.

Figure 1:
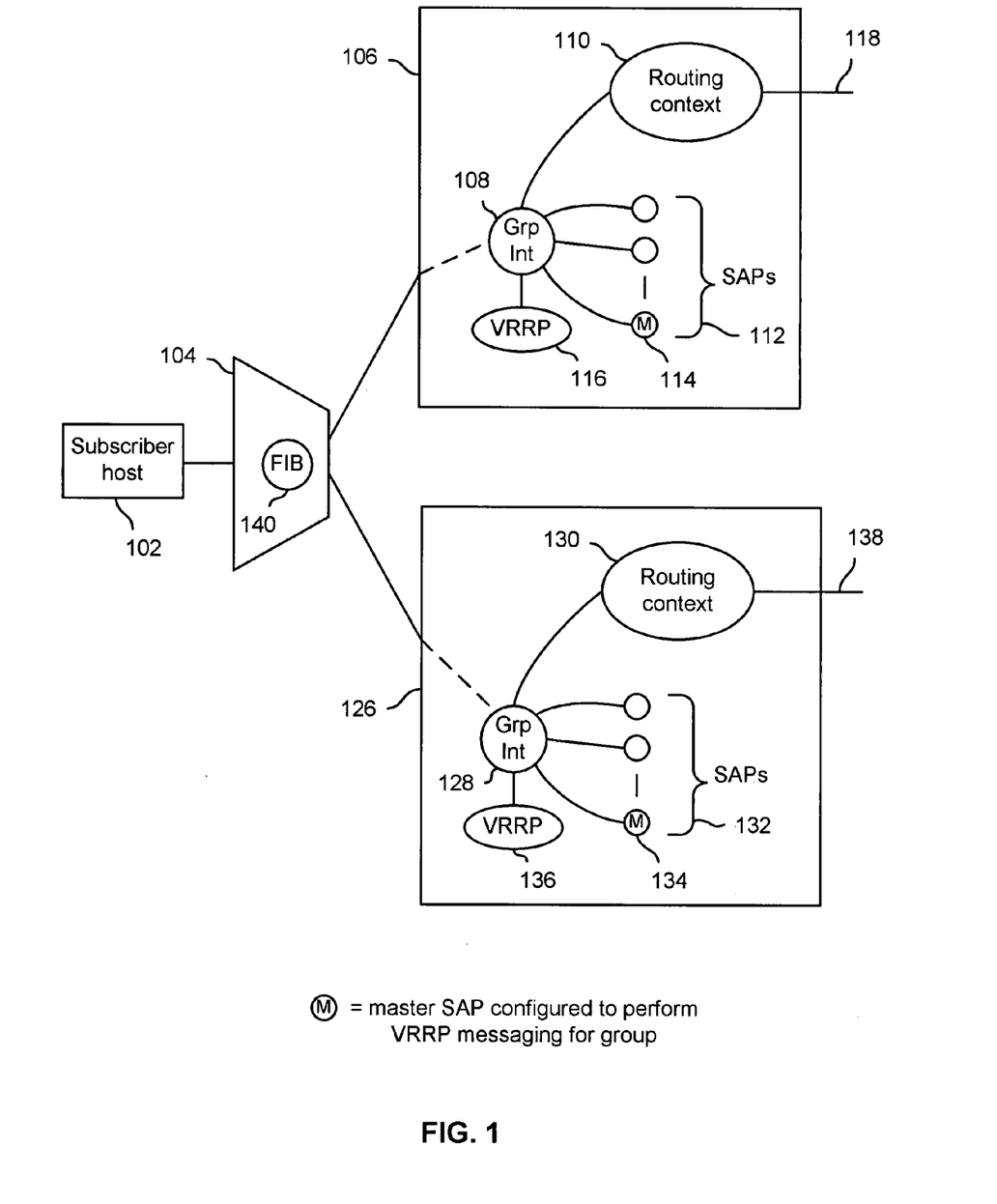
FIG. 1 is a block diagram illustrating an embodiment of a system for providing router redundancy for multiple subscriber subnets.

FIG. 1 is a block diagram illustrating an embodiment of a system for providing router redundancy for multiple subscriber subnets. In the example shown, a set of one or more subscriber hosts represented in FIG. 1 by subscriber host 102 have access to network services via a digital subscriber line access multiplexer (DSLAM) 104 that is connected to a core provider network (not shown) by multiple provider edge routers 106 and 126. In some embodiments, one or the other of routers 106 and 126 is configured to be in a "master" state and the other in a "standby" state with respect to traffic associated with subscriber hosts associated with the DSLAM 104. In some embodiments, the virtual routing redundancy protocol (VRRP) is used to determine which of the two will serve as master at any given time. In the example shown, each of a plurality of subscriber hosts associated with DSLAM 104 is associated at router 106 with a corresponding service context, referred to in this example as a "service access point" or SAP, each of which is associated with an unnumbered group interface 108. A master SAP 114 included in the plurality of service access points 112 serves as the master for the group for purposes of the VRRP and controls and performs VRRP functionality through an associated VRRP instance 116 associated with group interface 108. Traffic associated with the service access points 112 included in the group, upon arrival at router 106 via the connection (e.g., physical port) associated with DSLAM 104 is associated at router 106 with the group interface 108 and is routed using a routing context 110 via a connection 118 to the core provider network (not shown). The second (e.g., standby) router 126 likewise includes a group interface 128, routing context 130, service access points 132, master SAP 134, shared VRRP instance 136, and connection 138 to the core provider network. In some embodiments, on a single router all of the service contexts (SAPs) in the group are in the same VRRP mode, e.g., either "master" or "standby" mode, and all change over together, for example from standby to master, in the event of failover or other switchover.

In some embodiments, group IP interfaces, such as group interfaces 108 and 128 in FIG. 1, are created as unnumbered interfaces and do not have local subnets of their own. Due to the unnumbered nature of the group interfaces providing gateway routing to the subscriber hosts, the large number of potential subscriber subnet gateway addresses, the need for master routing with the gateway MAC address, and the VLAN per subscriber potential forwarding model, VRRP cannot be used to provide gateway redundancy between edge routers in a dual homing situation, such as shown in FIG. 1. Therefore, to provide such redundancy, as described above, a single VRRP instance (e.g., 116 and 136) is provided and configured to provide gateway redundancy for all the subscriber hosts associated with the group interface.

Figure 2:
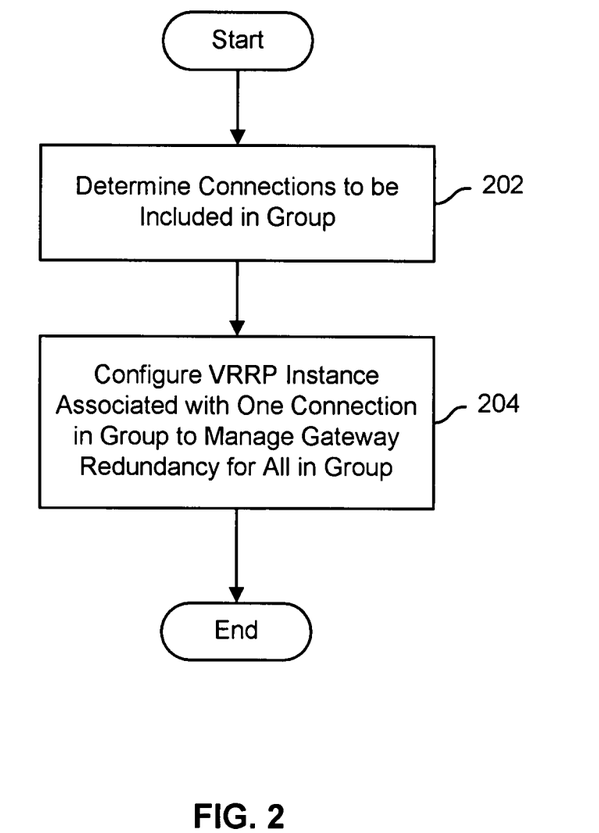
FIG. 2 is a flow chart illustrating an embodiment of a process for providing redundancy for multiple paths or connections.

FIG. 2 is a flow chart illustrating an embodiment of a process for providing redundancy for multiple paths or connections. In the example shown, it is determined which connections (e.g., subscriber hosts and/or subnets) are to be included together in a group (202). The group interface is configured and a single VRRP instance provided and configured to provide gateway redundancy for the subscriber hosts associated with the group interface (204).

In some embodiments, upon failover, a formerly standby router that has become active/master simply begins sending normal traffic using the shared MAC, so DSLAM FIBs, such as FIB 140 in the example shown in FIG. 1, get updated in the normal course, without special signaling. In some embodiments, a "becoming master" VRRP state is defined and configured to manage a controlled transition from a standby VRRP state to a master VRRP state. Upon failover, the former standby that has become active/master begins sending normal traffic using the shared MAC, so DSLAM FIBs get updated in the normal course, without special signaling. The new master also sends a gratuitous ARP, using the shared MAC, to populate FIBs on attached bridging devices. A "becoming master" state and associated out-of-band signaling are defined to facilitate failover.

Figure 3:
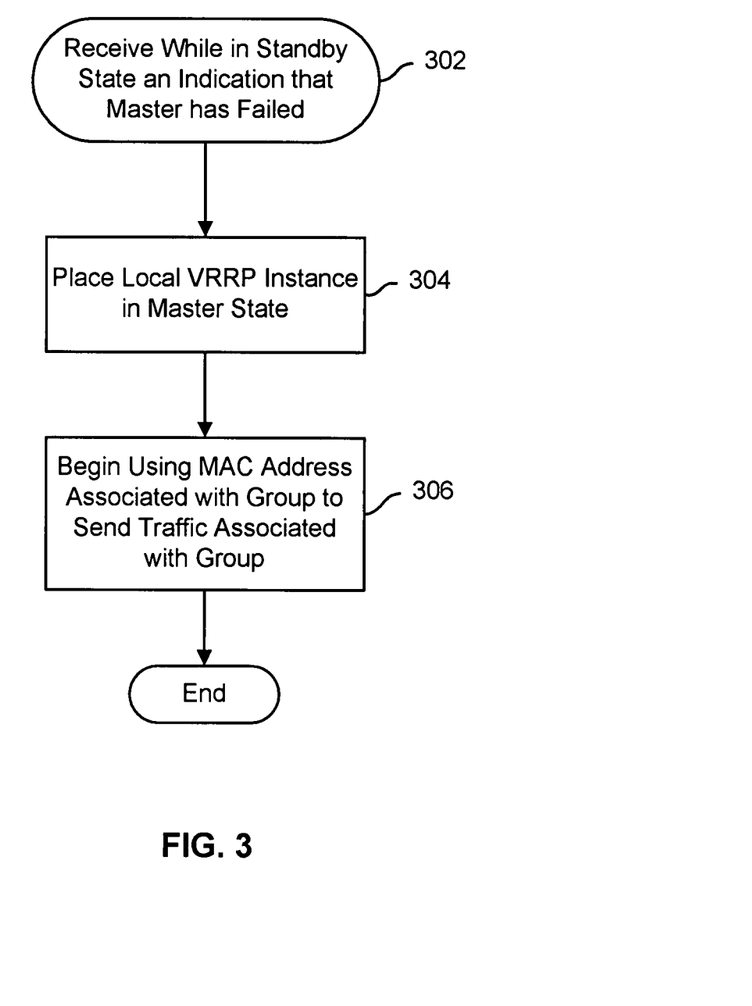
FIG. 3 is a flow chart illustrating an embodiment of a process for failing over from standby to master.

FIG. 3 is a flow chart illustrating an embodiment of a process for failing over from standby to master. An indication is received, while in a standby state, that a master router has failed (302). An example of such an indication is a determination that a prescribed interval has passed without receiving a VRRP advertisement from a single VRRP instance configured at the master to provide gateway redundancy with respect to multiple subnets. A local VRRP instance at the (formerly) standby router is placed in an active state (304). Rather than send VRRP messages to signal its new "master" state, as prescribed by the VRRP, the new "master" simply begins using a MAC address associated with the group to send traffic associated with the group (306). In some embodiments, a gratuitous ARP (i.e., one that is not a response to an ARP request) is sent by the new "master" router, to populate FIBs on attached bridging devices and/or other downstream nodes.

Figure 4:
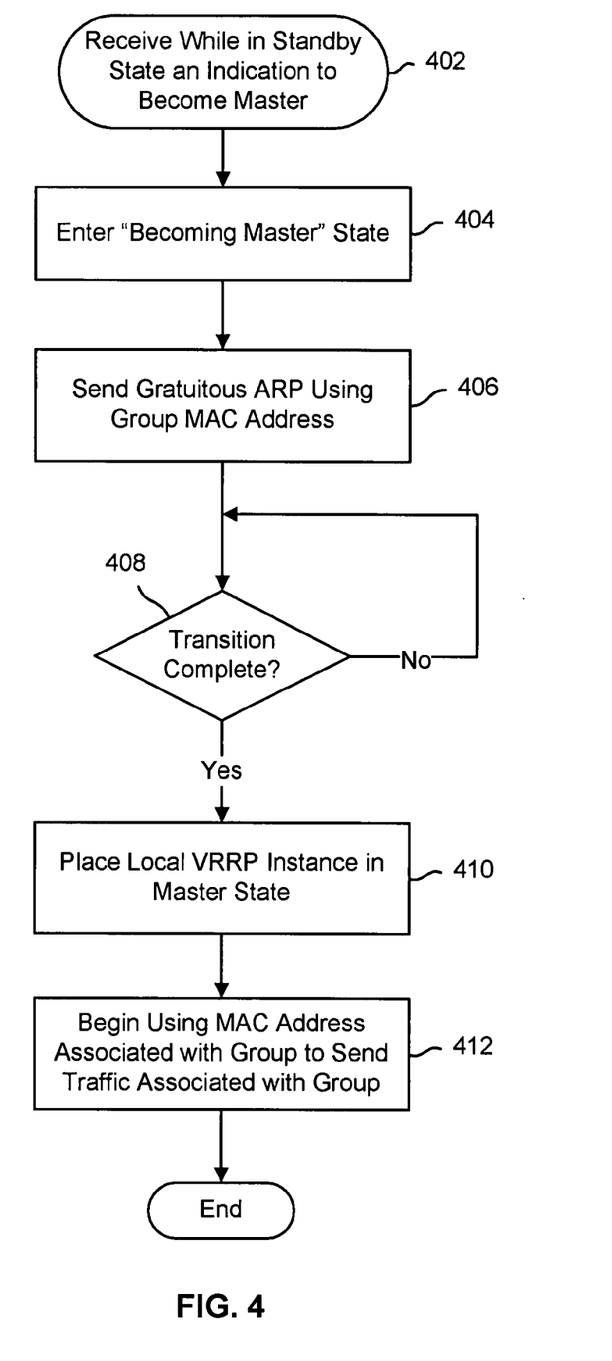
FIG. 4 is a flow chart illustrating an embodiment of a process for changing from a standby to a master VRRP state.

FIG. 4 is a flow chart illustrating an embodiment of a process for changing from a standby to a master VRRP state. In the example shown, an indication is received to become the "master" router with respect to a group interface (402). A "becoming master" state is entered (404). The VRRP protocol defines a "standby" state and a "master" state, and in some embodiments the VRRP is modified to recognize a "becoming master" state that is a transitional state between the "standby" and "master" states. In some embodiments, the becoming master state enables a standby router that has received an indication via out-of-band communication, as described herein, that it is to become master to initiate the procedures of becoming master with respect to all appropriate interfaces prior to actually entering the master state as defined in regular VRRP. A gratuitous ARP response is sent using a MAC address associated with the group (406). Once the transition to "master" state is ready to be completed (408), a local VRRP instance associated with the group is placed in the "master" state (410) and the new "master" router begins using the group MAC address to send traffic associated with the group (412).

Figure 5:
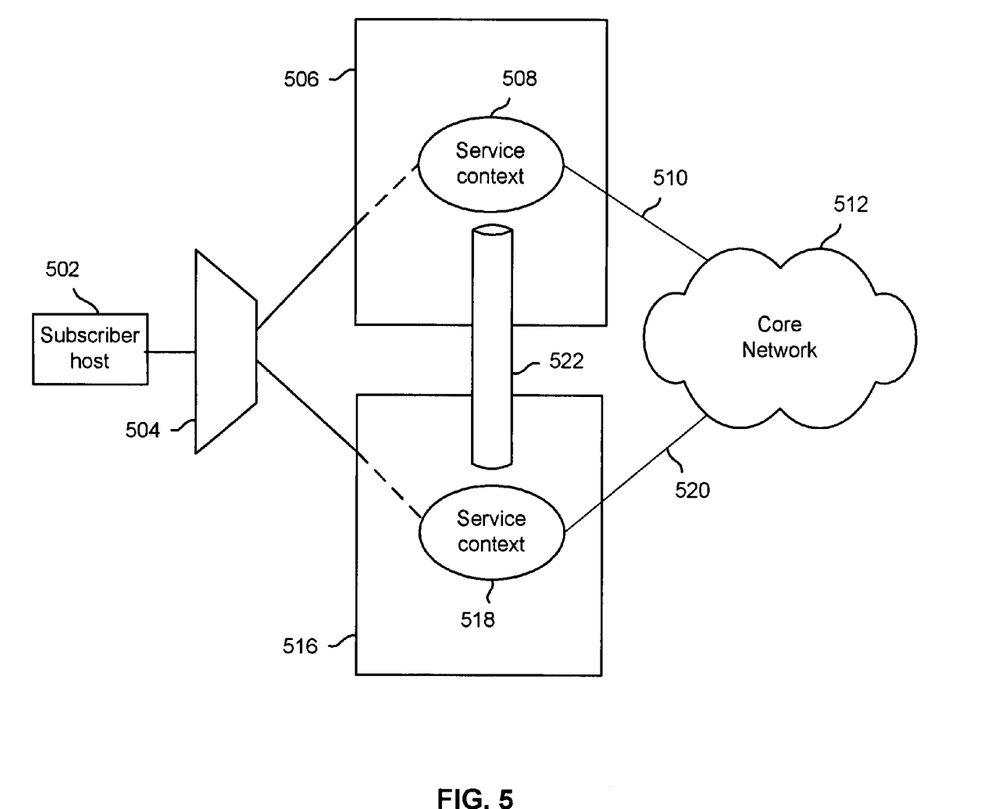
FIG. 5 is a block diagram illustrating an embodiment of a system for providing redundancy with respect to multiple IP subnets.

FIG. 5 is a block diagram illustrating an embodiment of a system for providing redundancy with respect to multiple IP subnets. In the example shown, a group of one or more subscriber hosts, represented in FIG. 5 by host 502, access network services via a DSLAM 504, provider edge routers 506 (with associated service context 508 and connection 510 to core network 512) and 516 (with associated service context 518 and connection 520 to core network 512). In some embodiments, a router in the "standby" state shunts to the master, e.g., via an MPLS tunnel or other redundant IP interface, such as interface 522 in the example shown in FIG. 5, inbound traffic associated with a subscriber host for which it is in standby, for example to facilitate enforcement of service level agreement and/or other policies and/or commitments with respect to traffic associated with a particular subscriber and/or service context. In the example shown, router 506 and router 516 each would advertise via its corresponding connection to core network 512 the ability to reach IP addresses associated with subnets accessible via DSLAM 504. For example, if subscriber host 502 had an IP address 1.1.1.100 and an associated subnet 1.1.1.0/24, each of routers 506 and 516 would advertise its ability to reach the subnet 1.1.1.0/24. However, as noted it may be desirable for service level and/or other policy enforce, accounting and/or billing, logging and/or auditing, etc. to have all traffic associated with a subscriber host pass through a specific one of the routers 106 and 116, e.g., whichever of them is in the "master" state. In some embodiments, a service or other context, such as service contexts 508 and 518 in the example shown in FIG. 5, is configured to shunt traffic to the master via a redundant IP interface such as the IP interface 522 while in the standby state with respect to the subscriber host/subnet with which the service context is associated. In some embodiments, the service contexts 508 and 518 of FIG. 5 are included in a group of service contexts associated with an unnumbered or other group interface, as in the example shown in FIG. 1, and all the service contexts in a group, while in standby, shunt associated traffic to the corresponding service context on the master router.

Figure 6:
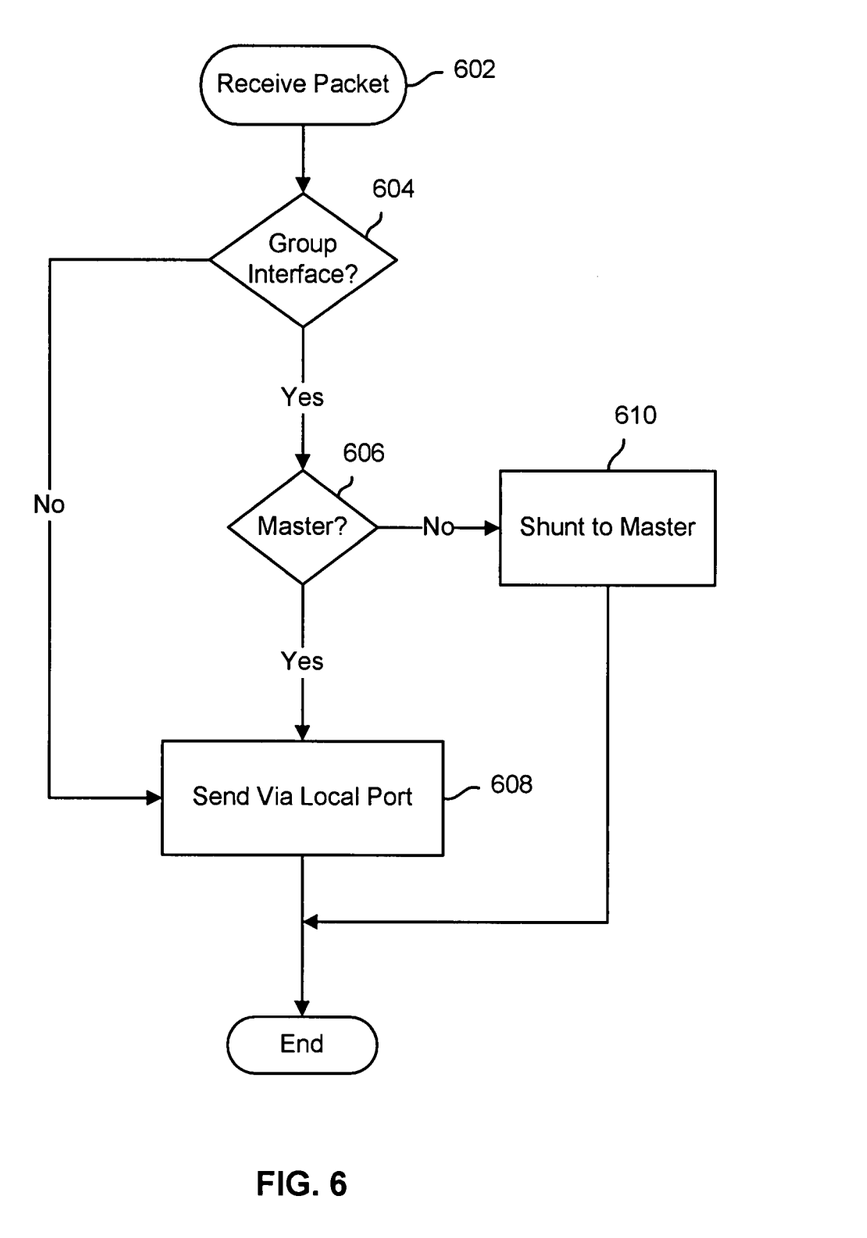
FIG. 6 is a flow chart illustrating an embodiment of a process for shunting traffic via a redundant IP interface.

FIG. 6 is a flow chart illustrating an embodiment of a process for shunting traffic via a redundant IP interface. In some embodiments, the process of FIG. 6 is implemented by a service context, such as service contexts 508 and 518, while in a standby state. In the example shown, upon receiving a packet (602) it is determined whether the packet is associated with a group interface (604). If so, it is determined whether a local VRRP instance associated with the group is in a "master" state (606). If the local VRRP instance is in the master state (606) or the packet is not associated with a group interface (604), the packet is forwarded via a local port associated with the destination (608). If the packet is associated with a group interface (604) but the local VRRP instance is not in the master state (606), the packet is shunted via a redundant IP interface (e.g., an MPLS tunnel) to the router that is currently in the master state with respect to the group with which the group interface is associated (610).

Using techniques described herein, overhead and bandwidth consumption associated with VRRP signaling are minimized and quicker failover/switchover to a standby gateway with minimal signaling is achieved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing gateway redundancy, comprising:
   associating with a plurality of subscriber subnets, on each of a master and a standby gateway, a single IP routing redundancy protocol instance; and
   using the single IP routing redundancy protocol instance associated with a subscriber subnet of the plurality of subscriber subnet to provide gateway redundancy for the plurality of subscriber subnets via a processor;
   wherein each of the plurality of subscriber subnet is associated with a corresponding service context and a plurality of subscriber hosts associated with the service context;
   wherein associating the single IP routing redundancy protocol instance with the plurality of subscriber subnets comprises configuring on each of the master and the standby gateway, a group IP interface and associating the plurality of subscriber subnets with the group IP interface, and associating the group interface with the single IP redundancy protocol instance, where the group interface is an interface that does not have local subnets of its own;
   wherein the single IP routing redundancy protocol instance provides that a single service or other context sends VRRP messages on behalf the plurality of subscriber subnets associated with the interface.

2. A method as recited in claim 1, wherein associating the single IP routing redundancy protocol instance with the plurality of subscriber subnets further comprises associating the single IP routing redundancy protocol instance with the group interface.

3. A method as recited in claim 1, wherein the single IP routing redundancy protocol instance comprises a virtual routing redundancy protocol (VRRP) instance.

4. A method as recited in claim 1, wherein each of at least a subset of the subscriber subnets is associated with a corresponding service context and associating the single IP routing redundancy protocol instance with the plurality of subscriber subnets comprises associating the single IP routing redundancy protocol instance with each of the respective service contexts.

5. A method as recited in claim 1, further comprising receiving at the standby gateway an indication that the standby gateway is to enter a master state and placing in the master state the single IP routing redundancy protocol instance at the standby gateway.

6. A method as recited in claim 5, wherein the indication comprises an indication that the master gateway has failed.

7. A method as recited in claim 5, wherein the indication comprises a determination that an advertisement message has not been received within a prescribed interval from the single IP routing redundancy protocol instance at the master gateway.

8. A method as recited in claim 5, wherein the indication comprises a communication from the single IP routing redundancy protocol instance at the master gateway requesting that the standby gateway enter the master state.

9. A method as recited in claim 5, wherein placing the single IP routing redundancy protocol instance at the standby gateway in the master state includes placing the single IP routing redundancy protocol instance at the standby gateway in a "becoming master" state associated with a transition from a standby state to the master state.

10. A method as recited in claim 1, further comprising receiving at the standby gateway an indication that the standby gateway is to enter a master state and entering a becoming master state prior to placing in the master state the single IP routing redundancy protocol instance at the standby gateway.

11. A method as recited in claim 5, wherein placing the single IP routing redundancy protocol instance at the standby gateway in the master state includes using a MAC address associated with the plurality of subscriber subnets to send a network communication associated with one or more of said subscriber subnets.

12. A method as recited in claim 5, wherein placing the single IP routing redundancy protocol instance at the standby gateway in the master state includes sending a gratuitous ARP message using a MAC address associated with the plurality of subscriber subnets.

13. A method as recited in claim 1, further comprising receiving at the standby gateway via an interface associated with a core provider network an IP packet associated with one or more of the plurality of subscriber subnets; and shunting the received IP packet to the master gateway.

14. A method as recited in claim 13, wherein the IP packet is shunted via a redundant IP interface connecting the standby gateway and the master gateway.

15. A method as recited in claim 14, wherein the redundant IP interface comprises an MPLS tunnel.

16. A router, comprising:
   a communication interface associated with a plurality of subscriber subnets; and
   a single IP routing redundancy protocol instance of a subscriber subnet of the plurality of subscriber subnets associated with the communication interface and configured to provide IP routing redundancy with respect to the plurality of subscriber subnets;
   wherein each of the plurality of subscriber subnet is associated with a corresponding service context and a plurality of subscriber hosts associated with the service context;
   wherein the single IP routing redundancy protocol instance is associated with a group interface associated with the plurality of subscriber subnets; and
   wherein the communication interface is an interface that does not have local subnets of its own;
   wherein the single IP routing redundancy protocol instance provides that a single service or other context sends VRRP messages on behalf the plurality of subscriber subnets associated with the interface.

17. A router as recited in claim 16, wherein each of the subscriber subnets has associated with it a corresponding service context instance and each such service context instance is associated with the communication interface.

18. A computer program product for providing gateway redundancy, the computer program product being embodied in a non-transitory computer readable storage medium and comprising computer instructions for:

associating with a plurality of subscriber subnets, on each of a master and a standby gateway, a single IP routing redundancy protocol instance; and using the single IP routing redundancy protocol instance associated with a subscriber subnet of the plurality of subscriber subnets to provide gateway redundancy for the plurality of subscriber subnets;

wherein each of the plurality of subscriber subnet is associated with a corresponding service context and a plurality of subscriber hosts associated with the service context;

wherein associating the single IP routing redundancy protocol instance with the plurality of subscriber subnets comprises configuring on each of the master and the standby gateway, a group IP interface and associating the plurality of subscriber subnets with the group IP interface, and associating the group interface with the single IP redundancy protocol instance, where the group interface is an interface that does not have local subnets of its own;

wherein the single IP routing redundancy protocol instance provides that a single service or other context sends VRRP messages on behalf the plurality of subscriber subnets associated with the interface.

19. A router as recited in claim 16, wherein the communication interface is configured to receive an indication that the router is to enter a master state and placing in the master state the single Internet Protocol routing redundancy protocol instance.

20. A router as recited in claim 19, wherein the indication comprises an indication that a master gateway has failed.

* * * * *

UNITED STATES PATENT AND TRADEMARK OFFICE
CERTIFICATE OF CORRECTION

| | |
|---|---|
| PATENT NO. | : 8,699,327 B2 |
| APPLICATION NO. | : 11/712596 |
| DATED | : April 15, 2014 |
| INVENTOR(S) | : Regan et al. |

Page 1 of 1

It is certified that error appears in the above-identified patent and that said Letters Patent is hereby corrected as shown below:

On The Title Page, Item (56), References cited, delete "EP 1633089 8/2006".

Signed and Sealed this
Sixteenth Day of August, 2016

Michelle K. Lee
*Director of the United States Patent and Trademark Office*